Sept. 9, 1958    J. P. SCANLAN ET AL    2,851,216
DEVICE ADAPTED FOR RESPIRATION COOLING
AND PROCESS OF MAKING SAME
Filed Jan. 13, 1954    2 Sheets-Sheet 1
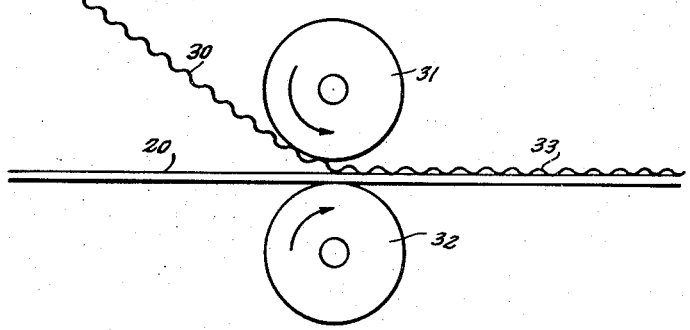
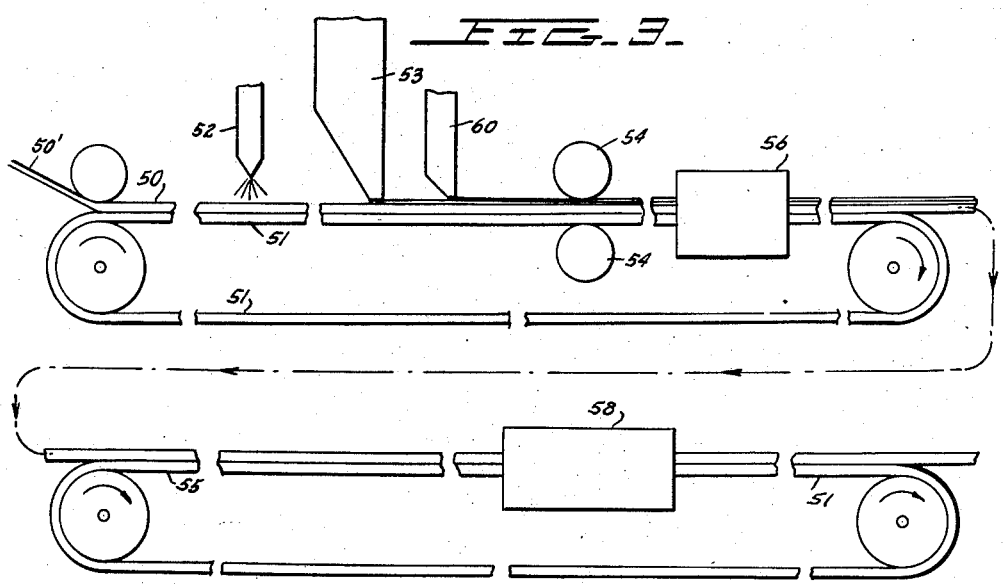
INVENTORS
J. P. SCANLAN
L. ALTER
BY
Greene, Pinelis & Durr
ATTORNEYS Sept. 9, 1958          J. P. SCANLAN ET AL          2,851,216
              DEVICE ADAPTED FOR RESPIRATION COOLING
                     AND PROCESS OF MAKING SAME
Filed Jan. 13, 1954                             2 Sheets-Sheet 2
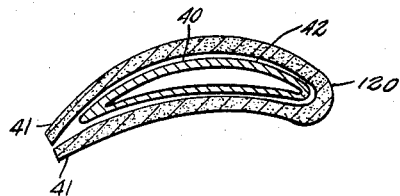
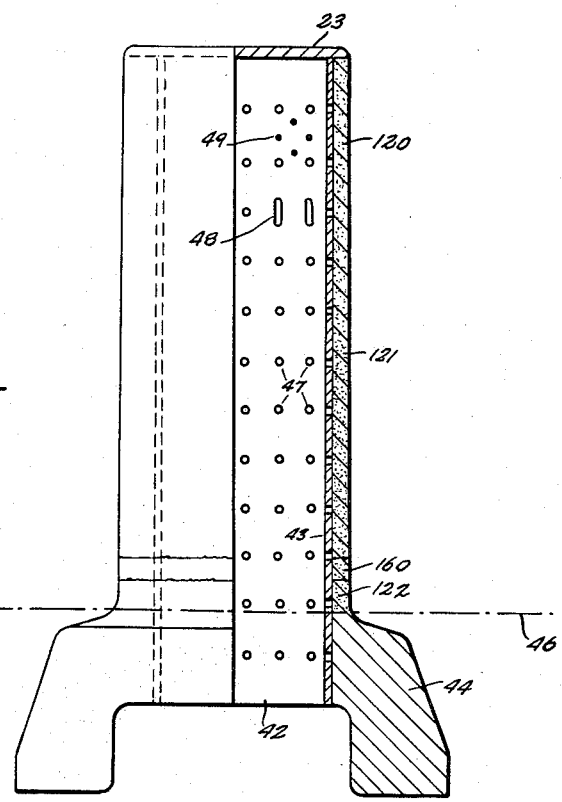
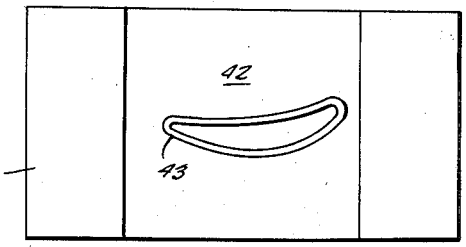
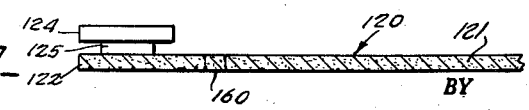
INVENTORS
J. P. SCANLAN
L. ALTER
BY
Greene, Pineles & Durr
ATTORNEYS

United States Patent Office 2,851,216
Patented Sept. 9, 1958

2,851,216

DEVICE ADAPTED FOR RESPIRATION COOLING AND PROCESS OF MAKING SAME

Joseph P. Scanlan, Yonkers, and Louis Alter, Bronx, N. Y., assignors to Schwarzkopf Development Corporation, a corporation of Maryland Application January 13, 1954, Serial No. 403,796

6 Claims. (Cl. 253—39.15)

This invention relates to a process of making articles which may be cooled by respiration cooling methods, and to the articles such as turbine blades, so produced.

Among the objects of the invention is to provide porous metal strip material which is flexible and ductile, and which can be bent or curved to any desired shape and welded to itself or to other metal parts to produce turbine buckets, etc.

Among other objects of the invention is to provide a method of making articles from such porous metal strips which are ductile.

This invention is based on the discovery that sintered metal bodies of great ductility and porosity as well as great strength can be obtained from metal powder of the same shape which contains a thermosetting resin. In spite of the fact that the individual metal particles are first coated all over with thermosetting resin in the "B" state, for example, and even when no substantial pressure is employed to compact the coated metal powders, the process of first setting the resin and subsequently sintering the metal, thereby decomposing the resin, results in a porous body or sheet in which the said metal particles are bonded to each other so well that thin sheets of the material can be bent 90°–130° or more without cracking, and if rolled and annealed, can be bent as much as 160° or more without cracking. The metal particles which are coated with thermosetting resin are first packed to shape (of a thin sheet, for example) and heat treated to cure and set the resin. Thereafter, the sheet is treated at the sintering temperature in a reducing atmosphere, whereupon the thermosetting resin is decomposed and metal-to-metal bonds replace the metal-to-resin bonds. These sheets are ductile and flexible enough to be employed for the fabrication of parts with irregular surfaces, blades of turbine buckets, for example.

As the metal powders, any desired metal powder ordinarily employed in powder metallurgy may be employed. The process is very advantageous when making articles from powders of stainless steels, nickel, and nickel alloys.

The thermosetting resins may be the phenol aldehyde resins such as phenol formaldehyde condensation products, phenol furfural condensation products, the urea aldehyde resins such as the urea formaldehyde condensation products, and melamine resins. Other thermosetting resins, e. g., of the silicone or polyester types may also be employed. Thermoplastic polymers are unsuitable. Reinforcing perforated metal sheets or wire mesh fabrics may be incorporated into the products during this manufacture.

The porosity of the sheet material may be controlled by the size and size distribution of the metal particles and to a lesser degree by the amount of resin and the amount of pressure employed. After setting of the resin, the unsintered product can be readily handled. After sintering, the sheet may be rolled or otherwise worked in such a way as to reduce or change the shape of the pores. The pores obtained in the product are interconnected as is shown by the fact that liquids or gases may be forced through the sheets. One of the unexpected results obtained is that the presence of thermosetting resin during the early stages of sintering, minimizes shrinkage of the products during sintering so that a sheet of substantially the same size and shape as the resin-bonded sheet is obtained.

Another phase of the invention is based on the discovery that controlled infiltration to a portion of the ferrous metal type of sheet may be obtained by incorporating a line of particles which include silver powder into the sheet. The silver-containing line forms a barrier region or plane to the passage of infiltrating copper, for example, so that the porous sheet on either side of the line or region can be infiltrated without any of the infiltrating metal passing to the opposite side of the line or region.

The foregoing and other objects of the invention will be best understood from the following description of exemplifications of the same when read in connection with the accompanying drawing in which Fig. 1 is a perspective view of a typical mold to form the molded sheet;

Fig. 2 is a view illustrating one method of incorporating a metal reinforcing material into the sheet;

Fig. 3 illustrates a process of producing a continuous sheet of the reinforced porous product;

Fig. 4 is a view illustrating how the sheet may be employed to form a three-dimensional blade portion of a bucket;

Fig. 5 is a view of a bucket which includes the blade of Fig. 4;

Fig. 6 is a bottom view of the bucket of Fig. 5; and

Fig. 7 is a cross-sectional view of a modified form of sheet structure.

MODIFICATION

Briefly, the process of making the ductile, porous sheet material comprises the steps of coating the metal particles with a thermosetting resin, pressing the coated powders to sheet form, treating the formed sheet to cure the resin, sintering the resultant resin-bonded product so that the resin is decomposed, and thus eliminated, and metal-to-metal bonds between the particles are established. Fig. 1 shows a typical mold for pressing the powder to the shape of the sheet desired. The mold 10 comprises a cavity 11 of simple form, and it is obvious that other more complex cavities could be used, but since the product can be bent and twisted to any desired shape, it is seldom that any complicated form is called for. The pressure applied is not critical, and may be any amount from the small amount of pressure required to level the powder charge up to about 2 p. s. i. (pounds per square inch) for example. Compacting can also be performed by vibrating. Where no substantial pressure is used to form the sheet, the thermosetting resin is cured while the powder is still in the mold to produce the green resin-bonded product 20. After this product is sintered, it has substantially the identical shape of the sheet 20, although after sintering, it takes on a metallic luster.

After sintering, the cemented metal product may be rolled whereupon it takes the luster of a polished sheet, but retains most of its porosity, especially when rolled between rollers of large diameter. In the rolled or unrolled state, the product is ductile and can be hammered, twisted or bent to a surprising degree without cracking. The ductility of the rolled sheet may be further improved by annealing.

MODIFICATION 2

Also, a reinforcing screen or perforated metal sheet can be rolled into the sintered sheet or can be incorporated with the sheet at the time the sheet is pressed to form in the mold 10 of Fig. 1 or into the resin-bonded sheet. Fig. 3 shows a porous sheet 30 being rolled into a sintered or partially sintered sheet 20 by rollers 31, 32 to produce the sheet 23. Where nickel, nickel alloys or stainless steel powders are employed as the powder particles, an excellent bond can be obtained between the porous sheet 20 and the reinforcing sheet 30 by previously coating the reinforcing sheet with copper and sintering the combined reinforcing sheet and porous metal product 23.

MODIFICATION 3

If desired, a continuous metal fabric may be continuously coated with a ductile porous sintered powder metal coating as shown in Fig. 3. The metal fabric 50 is fed onto belt 51, and while on said belt, a copper coating is sputtered or sprayed thereon at 52. Next, a layer of metal particles coated with synthetic resin is deposited thereon at 53, and the fabric is continuously passed between leveling rollers 54, 55, and then through a curing oven 56 which may be heated to the curing temperature of the resin by infrared lamps for example. Thereafter, either continuously or at a later time, the resin-bonded sheet is passed through a sintering furnace 58 suitably heated to the sintering temperature. In this way, long sheets of the porous metal products may be obtained which are suitable for the manufacture of large filtering devices or catalytic chambers for use in chemical processes.

MODIFICATION 4

Where the modified form of sheet shown in Fig. 5 is desired, silver particles or a mixture of ferrous metal particles and silver particles may be deposited along a narrow region of the sheet by the hopper 60 which is substantially the same width as the region desired. The amount of silver powder in the ferrous powder which is to form the barrier region (160 in Fig. 7) may depend on the sintering temperature. Generally satisfactory results are obtained with 2–10% or more of silver.

The following examples show exactly how the sheets are made according to the process.

*Example 1*

Stainless steel powder of size to pass a 325 mesh screen is continuously stirred while 1%–1½% of phenol formaldehyde resin in the acetone-soluble or "B" state, dissolved in acetone is incorporated into the stainless steel powder. As the acetone evaporates from the powder, agglomerates are formed, but the stirring is continued until substantially all the acetone has evaporated. The powder is then sifted to remove agglomerates. The thus coated powder is introduced into a mold as shown in Fig. 1 and formed into a flat sheet which is approximately 3/16" to 1/4" thick. While still in the mold, the sheet is introduced into an oven at 450° F. for approximately 30 minutes to produce a resin-bonded product.

The resin-bonded product is then put into a metal boat provided with activated ferrochrome as a getter and introduced into a sintering atmosphere. During sintering, the body is heated to 2400° F. for 1½ hours while hydrogen or cracked ammonia is passed through the gettered boat. A flat slab of cemented metal having a metallic luster results which can be bent 130° without cracking.

*Example 2*

The process is conducted as in Example 1, except that a perforated stainless steel sheet which has been coated with copper by sputtering is introduced into mold 10 before introducing the powder and the resulting product contains said perforated stainless steel sheet intimately bonded to the powder particles. The porosity of various parts of the final product can be controlled by varying the number and/or size of orifices in various parts of the reinforcing sheet.

*Example 3*

The process is conducted as in Example 1, except that prior to the final sintering process, a copper-coated screen is rolled into the resin-bonded sheet.

*Example 4*

The process is conducted as in Example 1, except that the resin-bonded product is presintered for only ¾ hour and thereafter a screen is rolled into the sheet, whereupon the final sintering is carried out at 2400° F. for 1½ hours.

*Example 5*

The process is conducted as in Example 1, except that urea formaldehyde or melamine resin is substituted for phenol formaldehyde resin.

*Example 6*

The product obtained in Examples 1–5 is rolled between rollers one or more times to reduce the thickness approximately .0015" per pass and to provide a smooth-surfaced porous sheet.

*Example 7*

The process is conducted as in Examples 1–6, except that nickel powder particles are employed in place of stainless steel.

The products produced by all of the above examples are porous sheets which are bendable, ductile, weldable, and still porous. The porosity can be varied to from 5 to 10% up to 55%.

With Example 1, for example, the porosity obtained is approximately 45%.

MODIFICATION 5

A modified form of sheet 120 illustrated in Fig. 7 is formed from ferrous metal powders according to the above examples by introducing powder containing 2–10% of silver powder along a region 160 (Fig. 7) from a hopper 60 of Fig. 3 for example. This sheet comprises the porous regions 121 and 122 separated by the linear region 160 which includes the silver particles. As illustrated in Fig. 7, the region 122 may be infiltrated by copper without disturbing the porosity of region 121. For example, copper disk 124 supported on iron body 125 is placed on the sheet 120 before or after final sintering and thereafter the assembly is heated to the melting point of the copper. In passing through iron body 125, the molten copper dissolves substantially all the iron it will dissolve before reaching the porous region 122 which is being infiltrated. The barrier region 160 prevents penetration of the molten copper into region 121.

The above described sheets may be used to form turbine buckets in the way illustrated in Figs. 4 and 5.

The sheet 120, for example, is rolled about a mandrel 40 to form the sheet of blade shape 120. After being formed to the shape of mandrel 40, the sheet is cut to size and the edges 41, 41 are welded to form the blade trailing edge. An end portion 23 may be welded to the top edge of the sheet 120 (see Fig. 5). Thereafter, the mandrel is removed and the blade is placed onto a previously prepared bucket skeleton 42 comprising a root portion 44 and a reinforcing perforated sleeve 43. The parts are welded together at the contiguous portions thereof along the plane indicated by the chain line 46 to provide the desired bucket. The sleeve 43 contains a plurality of perforations 47 and also contains a plurality of enlarged perforations 48. Areas containing closely spaced perforations 49 are also provided. In this way, the penetrability of different parts of the blade to cooling liquids can be varied as desired in spite of the fact that the surface sheet 120 of the blade is of uniform porosity.

Any form of sheet may be employed to make the blade but improved welding at the contacting portions along plane 46 is obtained with the sheet 120 having the copper infiltrated end portion 122.

The features and principles underlying the invention described above in connection with specific exemplifications, will suggest to those skilled in the art, many other modifications thereof. It is accordingly desired that the appended claims shall not be limited to any specific features or details shown or described in connection with exemplifications thereof.

We claim:

1. In a shaped body, a sheet structure formed of sintered ferrous metal particles which is curved over a substantial region thereof, with two edge regions of said sheet structure being joined to each other into a continuous three-dimensional hollow body, said sheet structure being originally formed to have 5% to 55% porosity so as to pass fluid through the pores of said sheet structure, said sheet structure having one sheet region separated by a barrier region from a further sheet region thereof, the pores of said further sheet region being filled with a cuprous infiltrant metal, said barrier region comprising ferrous metal mixed with silver which suppresses flow of molten cuprous infiltrant past said barrier region into said one region while said further region is being infiltrated with said infiltrant metal.

2. In a shaped body as claimed in claim 1, said sheet structure having secured thereto a reinforcing sheet member of metal having perforations therein, the pores of said sintered-particle sheet structure being interconnected with the perforations of said reinforcing sheet member for passing fluids successively through said pores and said perforations.

3. In a shaped body as claimed in claim 2, said sheet structure having an additional edge region on said further sheet region that is filled with said infiltrant metal, and a supporting metal structure united to the said infiltrated additional edge region of said sheet structure.

4. In a shaped body as claimed in claim 1, said sheet structure having an additional edge region on said further sheet region that is filled with said infiltrant metal, and a supporting metal structure united to the said infiltrated additional edge region of said sheet structure.

5. In a shaped structure, a hollow wall member of sintered ferrous metal particles having one ferrous body section exhibiting substantial porosity and permitting passage of fluid therethrough and a further ferrous body section of similar sintered metal particles, a solidified cuprous infiltrant metal filling all pores of said further ferrous body section, said one ferrous body section being separated from said further ferrous body section by a barrier region comprising ferrous metal mixed with silver which at the raised temperature of the molten infiltrant metal suppresses flow of the molten infiltrant metal from said further ferrous body section into the pores of said one ferrous body section.

6. In a shaped fluid guiding structure, a hollow ferrous fluid-guiding member of sintered ferrous metal particles having one ferrous body region with interconnected pores exhibiting substantial porosity for passing cooling fluid through the walls thereof, and a further ferrous body region of similar sintered ferrous metal particles, solidified infiltrant metal filling all pores of said further ferrous body region, said one region being separated from said further region of said fluid-guiding member by a barrier region comprising ferrous metal mixed with silver particles which at the raised temperature of the molten infiltrant metal suppresses flow of the molten infiltrant from said further ferrous body region into the pores of said one ferrous body region.

References Cited in the file of this patent

UNITED STATES PATENTS

| | | |
|---|---|---|
| 2,390,160 | Marvin | Dec. 4, 1945 |
| 2,554,343 | Pall | May 22, 1951 |
| 2,633,628 | Bartlett | Apr. 7, 1953 |
| 2,648,520 | Schmitt | Aug. 11, 1953 |
| 2,665,881 | Smith | Jan. 12, 1954 |
| 2,672,415 | Balke | Mar. 16, 1954 |
| 2,714,245 | Goetzell | Aug. 2, 1955 |

FOREIGN PATENTS

| | | |
|---|---|---|
| 619,634 | Great Britain | Mar. 11, 1949 |
| 696,715 | Great Britain | Sept. 9, 1953 |